No. 775,431. PATENTED NOV. 22, 1904.
S. STERNAU, J. P. STEPPE & L. STRASSBURGER.
COFFEE MACHINE.
APPLICATION FILED JAN. 31, 1903.
NO MODEL.

Witnesses:
Jas. F. Coleman
Jno. Rob't Taylor

Inventors
Sigmund Sternau
John P. Steppe
Lionel Strassburger
by Pyper Edmonds & Dyer
Attorneys No. 775,431.

Patented November 22, 1904.

UNITED STATES PATENT OFFICE.

SIGMUND STERNAU, JOHN P. STEPPE, AND LIONEL STRASSBURGER, OF NEW YORK, N. Y., ASSIGNORS TO S. STERNAU & CO., OF NEW YORK, N. Y., A FIRM.

COFFEE-MACHINE.

SPECIFICATION forming part of Letters Patent No. 775,431, dated November 22, 1904.

Application filed January 31, 1903. Serial No. 141,260. (No model.)

*To all whom it may concern:*

Be it known that we, SIGMUND STERNAU, residing in the borough of Manhattan, city, county, and State of New York, JOHN P. STEPPE, residing in the borough of Brooklyn, county of Kings, city and State of New York, and LIONEL STRASSBURGER, residing in the borough of Manhattan, city, county, and State of New York, citizens of the United States, have invented a certain new and useful Improvement in Coffee-Machines, of which the following is a specification.

Our invention relates to improvements in coffee-machines of the type designed for the manufacture of drip-coffee and arranged for the production of the beverage at the time of serving the same.

In order that the invention may be better understood, attention is directed to the accompanying drawings, forming part of this specification, and in which—

Figure 1:
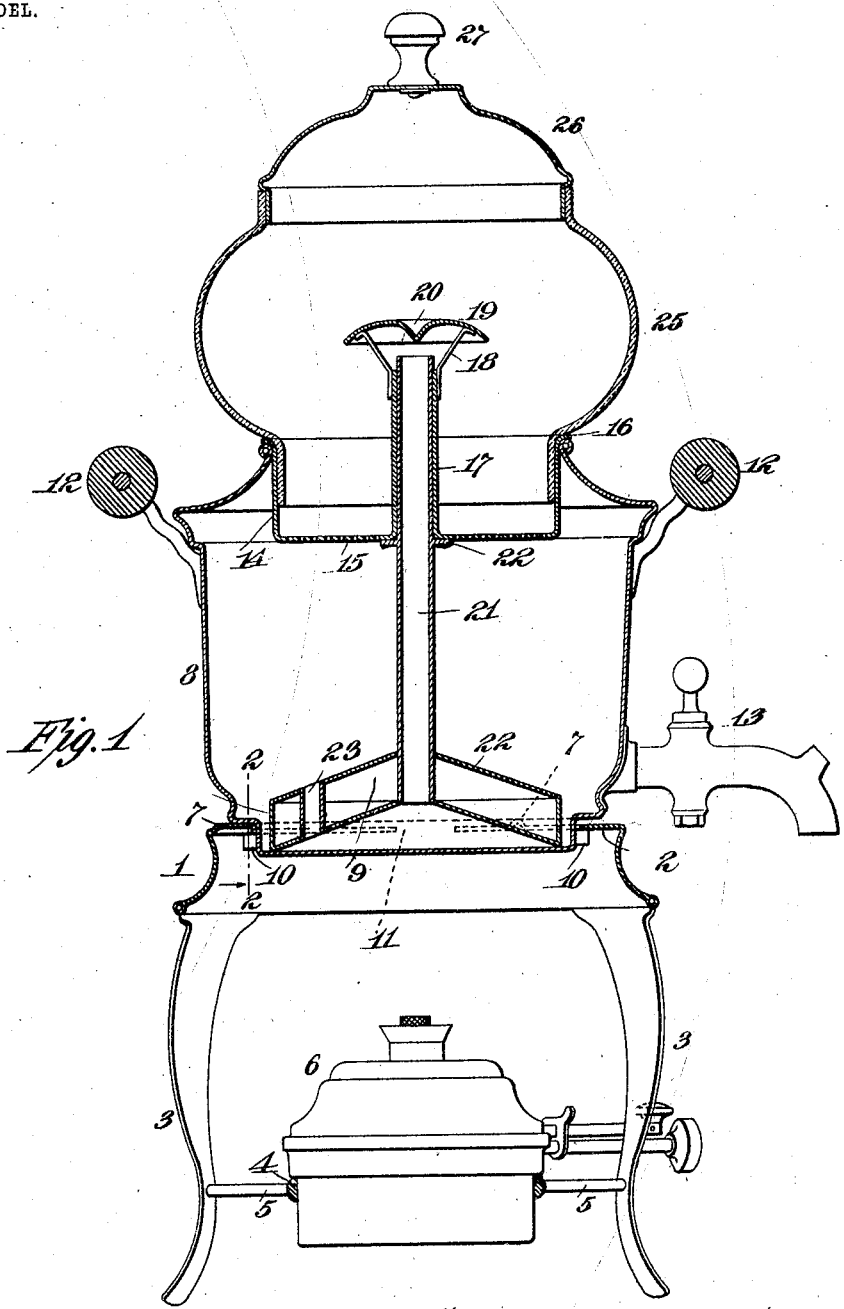
Figure 2:
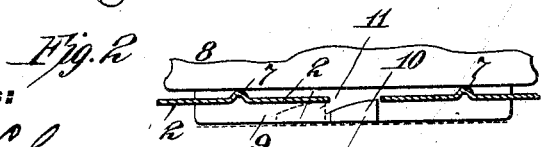

Figure 1 is a longitudinal sectional view through our improved coffee-machine of its preferred type; and Fig. 2, a section on the line 2 2 of Fig. 1, illustrating particularly the preferred form of lock between the receptacle and stand.

In both of the views corresponding parts are represented by the same numerals of reference.

The stand is composed of the ring or annulus 1, having a horizontal top member 2, three or more legs or standards 3, a lamp-ring 4, and arms 5, connecting the lamp-ring with the legs or standards. The lamp-ring 5 carries a lamp of any suitable construction. In the drawings we illustrate an alcohol-lamp 6 of a modern type. The horizontal portion 2 of the ring or annulus 1 of the stand is provided with struck-up ribs 7, on which the receptacle 8 is seated, so that an air-space will be formed between the receptacle and ring through which air may circulate to prevent the stand from becoming unduly heated. The receptacle 8 is formed with a contracted bottom portion 9, fitting within the ring or annulus 1, as shown, and carrying a plurality of lugs 10, which pass through openings 11 in the horizontal portion 2, as shown in Fig. 2. The lugs 10 are provided with inclined upper faces, so that by turning the receptacle slightly with respect to the stand the lugs will be jammed underneath the portion 2 of the annulus 1, (see dotted lines, Fig. 2,) so as to lock the receptacle 8 firmly in place upon the stand, as will be understood. Ordinarily the receptacle 8 is provided with handles 12 for lifting the same, which also may be used for transporting the entire machine. The receptacle is also supplied with a valved nozzle 13 for drawing off its contents. The upper end of the receptacle 8 receives the metal coffee-holder 14, having a foraminated bottom 15 and a rim 16 at its top. Rising from the center of the bottom 15 is a sleeve 17, provided at its top with two or more arms 18, carrying the deflector 19. This deflector is preferably formed with a conical depression 20 at its center, so as to more effectively spread the boiling water and prevent it from dropping back into the central tube. This central tube 21 passes through a flat funnel-shaped hollow body 22, resting upon the bottom of the receptacle 8. Water enters the space inclosed by the funnel-shaped body 22 through a tube 23 at one side of the central tube. The central tube 21 extends above the top of the sleeve 17 and is provided with a shoulder 24, resting against the bottom of the coffee-holder, so as to hold the body 22 in position and at the same time prevent water from flowing into the receptacle between the central tube and sleeve. The glass globe 25 is of the form shown and at its bottom is received by the coffee-holder, but is entirely separable and removable therefrom instead of being permanently connected thereto, as is usual with devices of the type at present on the market. The glass globe 25 is provided with a metallic cover 26, having a handle 27.

In operation the glass globe 25 is first removed and then the coffee-holder is elevated, carrying the sleeve 17 and deflector 19 with it and leaving the funnel 22 and central tube in the receptacle. Water is now introduced into the receptacle and the holder 14 supplied with the necessary quantity of coffee. The holder 14 is now replaced in position, as is also the glass globe 25. The lamp 6 is now lighted and quickly results in the boiling of the water in the receptacle. The boiling water at the bottom of the receptacle will be projected upward through the central tube in a series of rapidly-recurring pulsations and will be distributed uniformly over the coffee in the holder by the deflector 19. Water of a slightly lower temperature circulates downward through the tube 23 into the space inclosed by the funnel, as will be understood. The boiling water deposited on the coffee will slowly percolate through the same, so as to extract the soluble constituents by an ordinary leaching operation. The operation is continued until the extract is sufficiently concentrated, whereupon the resulting beverage is removed through the valved nozzle 13.

The receptacle disclosed herein is not claimed in this application, but forms the subject-matter of a divisional application filed by us the 21st day of October, 1903, Serial No. 177,979.

Having now described our invention, what we claim as new, and desire to secure by Letters Patent, is as follows:

1. In a coffee-machine of the type described, the combination with a receptacle, of a stand, a lamp thereon, a series of ribs on the stand forming an air-space between it and the receptacle, and a lock for securing the receptacle to the stand, substantially as described.

2. In a coffee-machine of the type described, the combination with a receptacle, of a stand, a lamp thereon, a series of ribs on the stand forming an air-space between it and the receptacle, and a series of depending lugs on the receptacle engaging with recesses in the stand forming a lock for securing the receptacle to the stand, substantially as described.

3. In a coffee-machine of the type described, the combination with a receptacle, having handles thereon, of a stand, a lamp thereon, a series of ribs on the stand forming an air-space between it and the receptacle, and a lock for securing the receptacle to the stand, substantially as described.

4. In a coffee-machine of the type described, the combination with a receptacle, having handles thereon, of a stand, a lamp thereon, a series of ribs on the stand forming an air-space between it and the receptacle, and a series of depending lugs on the receptacle engaging with recesses in the stand forming a lock for securing the receptacle to the stand, substantially as described.

This specification signed and witnessed this 28th day of January, 1903.

SIGMUND STERNAU.
JNO. P. STEPPE.
LIONEL STRASSBURGER.

Witnesses:
  GRACE BLACK,
  THOS. F. BARY.